(12) United States Patent
Jang et al.

(10) Patent No.: US 8,967,042 B2
(45) Date of Patent: Mar. 3, 2015

(54) PRINTING APPARATUS FOR MANUFACTURING A SPACER AND METHOD OF MANUFACTURING A DISPLAY PANEL

(75) Inventors: Dae-Hwan Jang, Suwon-si (KR); Min-Uk Kim, Seongnam-si (KR); Moon-Jung An, Gwangmyeong-si (KR); Gug-Rae Jo, Asan-si (KR); Kyu-Young Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 495 days.

(21) Appl. No.: 13/153,272

(22) Filed: Jun. 3, 2011

(65) Prior Publication Data

US 2012/0133880 A1    May 31, 2012

(30) Foreign Application Priority Data

Nov. 30, 2010   (KR) .................. 10-2010-0120232

(51) Int. Cl.
*B41F 9/01*         (2006.01)
*G02F 1/1339*       (2006.01)
*B32B 38/00*        (2006.01)

(52) U.S. Cl.
CPC ........... *G02F 1/13394* (2013.01); *B32B 38/145* (2013.01); *B32B 2457/202* (2013.01)
USPC .......................................... 101/170; 101/158

(58) Field of Classification Search
CPC ........................................................ B41F 9/01
USPC .................................................. 101/170, 158
See application file for complete search history.

(56) References Cited

U.S. PATENT DOCUMENTS

| 2007/0008479 A1* | 1/2007 | Suh et al. ...................... 349/155 |
| 2007/0097312 A1* | 5/2007 | Park et al. ..................... 349/155 |
| 2007/0177073 A1* | 8/2007 | Seo et al. ...................... 349/110 |

\* cited by examiner

*Primary Examiner* — Judy Nguyen
*Assistant Examiner* — Jennifer Simmons
(74) *Attorney, Agent, or Firm* — Innovation Counsel LLP

(57) ABSTRACT

A printing apparatus for manufacturing a spacer includes a printing plate and a printing roller. The printing plate has a plurality of receiving recesses formed thereon. The receiving recess has a generally elliptical shape. The receiving recesses are infiltrated with a plurality of beads. The printing roller transfers the beads onto its outer surface by rolling over the receiving recesses, and transfers the beads from its outer surface onto an external substrate. Thus, the spacers may maintain a distance between the first and second substrates stably, so that press characteristics may be enhanced and smear defects occurring when the display panel is pressed may be prevented.

14 Claims, 9 Drawing Sheets

PRINTING APPARATUS FOR MANUFACTURING A SPACER AND METHOD OF MANUFACTURING A DISPLAY PANEL

PRIORITY STATEMENT

This application claims priority under 35 U.S.C. §119 to Korean Patent Application No. 2010-120232, filed on Nov. 30, 2010 in the Korean Intellectual Property Office (KIPO), the contents of which are herein incorporated by reference in their entirety.

BACKGROUND OF THE INVENTION

1. Field of the Invention

Example embodiments of the present invention relate generally to flat panel display fabrication. More specifically, example embodiments of the present invention relate to printing apparatuses for manufacturing a spacer, and methods of manufacturing a display panel.

2. Description of the Related Art

Generally, a liquid crystal display ("LCD") device includes an LCD panel displaying images by controlling the transmittance of a liquid crystal layer, and a light providing assembly providing light to the LCD panel. The LCD panel includes a first substrate on which a thin-film transistor ("TFT") is formed to act as a switching element, and a second substrate facing the first substrate. The liquid crystal layer is interposed between the first and second substrates.

The LCD panel typically also includes a plurality of spacers disposed between the first and second substrates. Each spacer is a member for maintaining a cell gap, or a distance between the first and second substrates. When the LCD panel is depressed by an external force, the spacers act to restore the cell gap to its original state. The spacers may be manufactured on the first substrate or the second substrate, and may be fabricated via a photolithograph process by using a photoresist. Alternatively, the spacers may be manufactured by distributing the spacers onto the first substrate, or a light-blocking area of the second substrate, through a mask. As a further alternative, the spacers may be manufactured by printing the spacers on the light-blocking area of the second substrate.

The printing method has been widely used to manufacture spacers due to its superior resolution, capability for use in manufacturing large size devices, and good printability. The printing method is generally performed by providing a printing roller with beads coated onto a printing plate, and transferring the beads onto a substrate. These beads become the spacers. However, concave portions of the printing plate often do not pick up any beads, which often results in a non-uniform coating of spacers on the substrate, where some areas contain an insufficient number of spacers. This results in areas of the substrate in which the cell gap cannot be maintained, or is easily collapsed, resulting in display defects such as spots or flickers, which reduce display quality.

SUMMARY OF THE INVENTION

Example embodiments of the present invention provide a printing apparatus for manufacturing spacers more uniformly, thus enhancing manufacturing reliability.

Example embodiments of the present invention also provide a method of manufacturing a display panel by using the above-mentioned printing apparatus.

According to one aspect of the present invention, a printing apparatus for manufacturing a spacer includes a printing plate and a printing roller. The printing plate has a plurality of receiving recesses formed thereon. The receiving recess each have a generally elliptical shape. The receiving recesses are configured to hold a plurality of beads. The printing roller transfers the beads in the receiving recesses onto an outer surface of the printing roller by rolling over the receiving recesses, and transfers the beads on the outer surface onto an external substrate.

In an example embodiment, a length of the major axes of the receiving recesses may be about 1.25 to about 2 times a length of the corresponding minor axes.

In an example embodiment, the number of beads infiltrated into every 1 $\mu m^2$ of the receiving recesses may be between about 0.072 and about 0.085.

In an example embodiment, a depth of the receiving recesses may be about 75% to about 85% of a diameter of the beads.

According to another aspect of the present invention, there is provided a method of manufacturing a display panel. In the method, a plurality of beads is infiltrated into each receiving recess of a printing plate. The receiving recesses have a generally elliptical shape. Then, a printing roller is rolled over the receiving recesses, so as to transfer the beads onto an outer surface of the printing roller. Then, the beads transferred onto the outer surface of the printing roller are transferred onto a light-blocking area of a first substrate, so as to form spacers on the first substrate. Then, a second substrate is coupled to the first substrate.

In an example embodiment, when the breads are infiltrated, a solution including the beads may be coated onto the printing plate, and then a blade may be scraped over a surface of the printing plate on which the solution is coated.

In an example embodiment, a length of a long axis of the receiving recesses may be between about 1.25 and about 2 times a length of a short axis of the receiving recesses.

In an example embodiment, the number of the beads infiltrated in every 1 $\mu m^2$ of the receiving recess may be more than about 0.072 and less than about 0.085, when the beads are infiltrated into the receiving recesses.

In an example embodiment, at least two beads may form a group when the spacer is formed on the first substrate, and the group may have a generally circular shape.

According to a printing apparatus for manufacturing a spacer and a method of manufacturing a display panel, the received number of spacers per unit area of the receiving recess may be increased, and the spacers may be more uniformly provided to each of plural receiving recesses. Thus, the spacers may maintain a distance between the first and second substrates more stably, so that press characteristics may be enhanced and smear defects occurring when the display panel is pressed may be prevented. Moreover, the distance between the first and second substrates may be maintained more uniformly, so that the display quality of the display panel may be improved.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Hereinafter, the present invention will be explained in detail with reference to the accompanying drawings.

Figure 1:
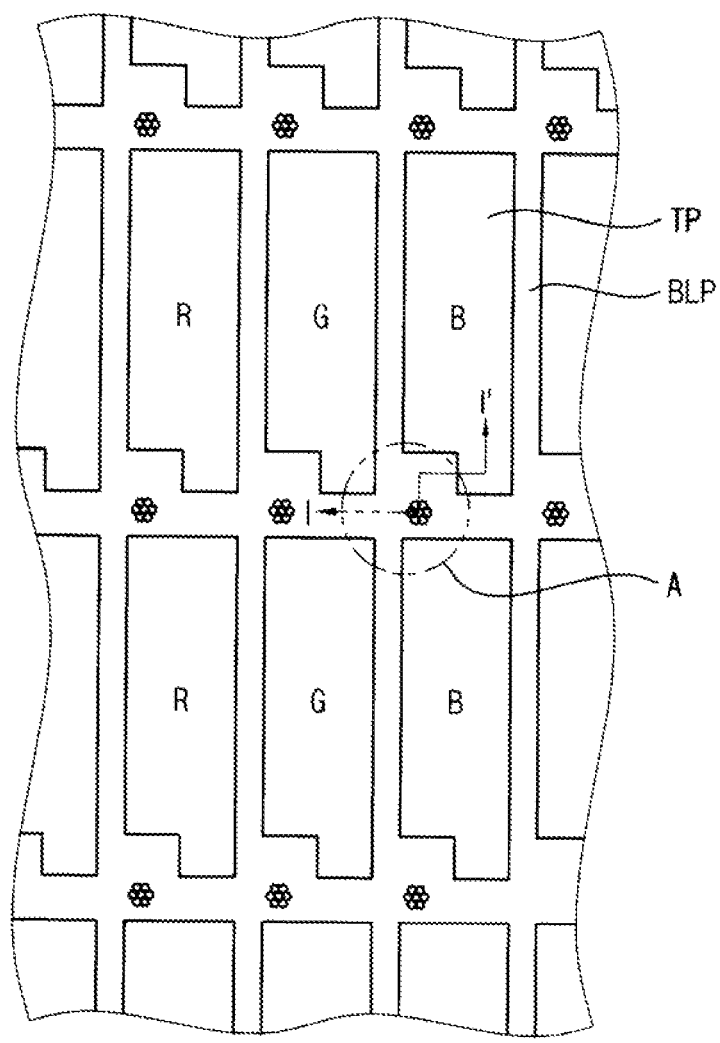
FIG. 1 is a plan view schematically illustrating a display panel manufactured in accordance with one exemplary embodiment of the present invention.
Figure 2:
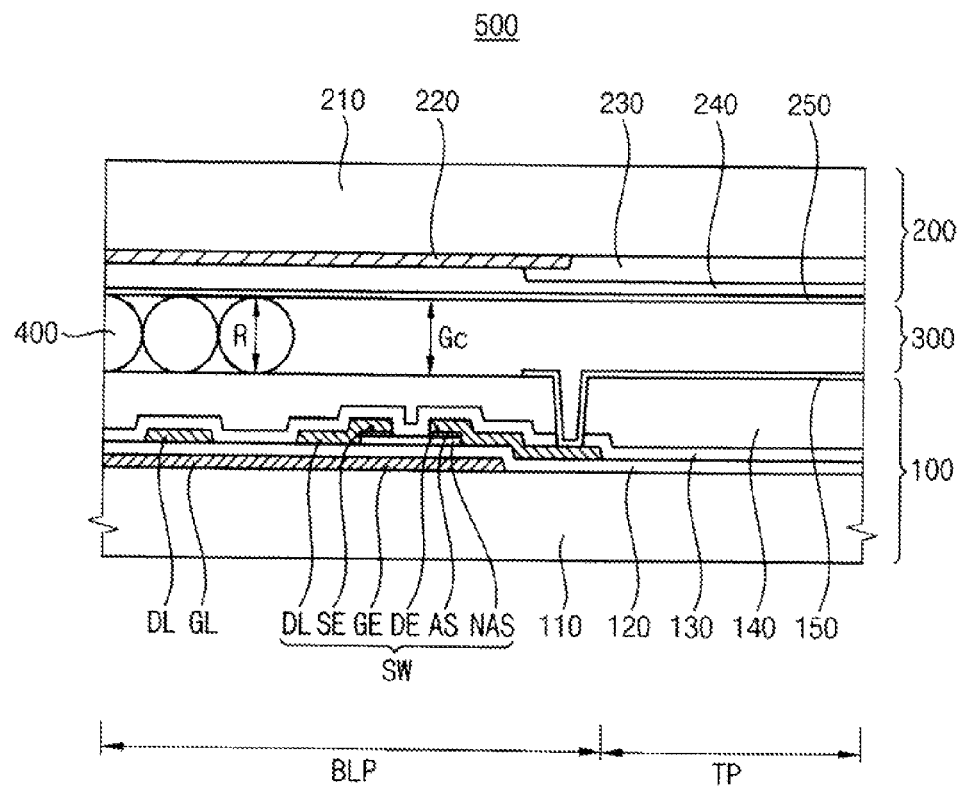
FIG. 2 is a cross-sectional view taken along a line I-I' of FIG. 1.

FIG. 1 is a plan view schematically illustrating a display panel manufactured in accordance with one exemplary embodiment of the present invention. FIG. 2 is a cross-sectional view taken along a line I-I' of FIG. 1.

Referring to FIGS. 1 and 2, a display panel 500 according to the present exemplary embodiment includes a first substrate 100, a second substrate 200, a liquid crystal layer 300 and a plurality of spacers 400. The display panel 500 may include a display area TP which is a transmissive area, transmitting light so as to display an image, as well as a light-blocking area BLP surrounding the display area TP. The display area TP may be divided into a red area R, a green area G and a blue area B in accordance with the color of a color filter deposited in that area.

The first substrate 100 may include a first base substrate 110, a gate line GL, a data line DL, a gate insulation layer 120, a thin-film transistor SW, a passivation layer 130, an organic layer 140 and a pixel electrode 150.

The gate line GL extends generally along a first direction D1 of the display panel 500, and the data line DL extends generally along a second direction D2 different from the first direction D1. The second direction D2 may be perpendicular to the first direction D1, although any directions are contemplated. The thin-film transistor SW includes a gate electrode GE connected to the gate line GL, a source electrode SE connected to the data line DL, a drain electrode DE spaced apart from the source electrode SE, a semiconductor pattern AS and an ohmic contact pattern NAS. The gate line GL, the data line DL and the thin-film transistor SW may be formed on the first substrate 100 of the light-blocking area BLP. The gate insulation layer electrically isolates the gate line GL from the data line DL, and electrically isolates the gate electrode GE from the source and drain electrodes SE and DE. The passivation layer 130 and the organic layer 140 may be formed on the thin-film transistor SW. Any one of the passivation layer 130 and the organic layer 140 may be omitted. The pixel electrode 150 is formed on the organic layer 140 to be electrically connected to the thin-film transistor SW. An area where the pixel electrode 150 is formed may be defined as a pixel area of the first substrate 100.

The second substrate 200 is a substrate facing the first substrate 100. The second substrate 200 may include a second base substrate 210, a black matrix pattern 220, a color filter 230, an overcoating layer 240 and a common electrode 250. The second substrate 200 is combined with the first substrate 100, so that the liquid crystal layer 300 may be interposed between the first and second substrates 100 and 200.

The black matrix pattern 220 may be formed on the second substrate 200 of the light-blocking area BLP. The black matrix pattern 220 is disposed to face the gate line GL, the data line DL and the thin-film transistor SW. The color filter 230 is formed on the second substrate 200 of the display area TP. An area where the color filter 230 is formed may be defined as a pixel area of the second substrate 200. The color filter 230 faces the pixel electrode 150. The display panel 500 may include a red pixel, a green pixel and a blue pixel, or any other desired color, in accordance with a color of the color filter 230. The overcoating layer 240 may be formed on the second substrate 200, and the common electrode 250 may be formed on the second base substrate 210 over the overcoating layer 240.

The spacers 400 are disposed between the first and second substrates 100 and 200 to maintain a cell gap Gc, that is, a distance between the outer surfaces of the first substrate 100 and the second substrate 200. The spacers 400 are disposed on the light-blocking area BLP. The spacers 400 may each directly contact the organic layer 140 of the first substrate 100 and the common electrode 250 of the second substrate 200. Each of the spacers 400 may be generally spherical beads, although any shape spacer 400 is contemplated. Each diameter R of the spacers 400 may be substantially equal to the cell gap Gc. The spacers 400 may include a material having elasticity, so that each spacer 400 returns to its original shape rather quickly after a compressive force is removed.

Although not shown in FIGS. 1 and 2, a seal line for connecting the first and second substrates 100 and 200 may be further formed between the first and second substrates 100 and 200. The seal line may be formed along outer areas of the first and second substrates 100 and 200.

Figure 3:
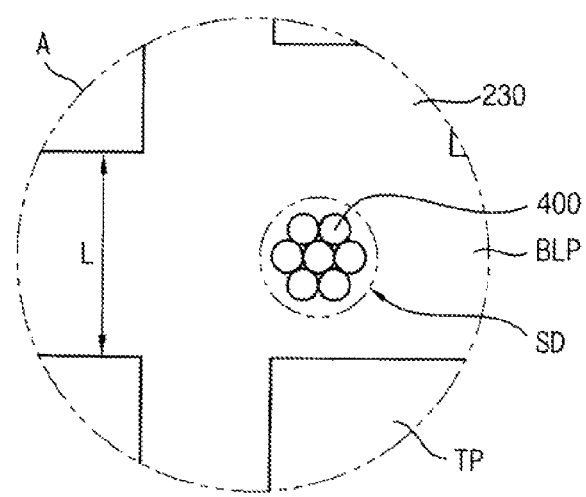
FIG. 3 is an enlarged plan view enlarging 'A' portion of FIG. 1.

FIG. 3 is an enlarged plan view of area 'A' of FIG. 1.

Referring to FIGS. 1, 2 and 3, the spacers 400 are disposed on the light-blocking area BLP. The spacers 400 are grouped to be generally adjacent to each other. For convenience of description, a group of adjacent spacers 400 is defined as a spacer group, and referred to as "SD." The spacer group SD may have a general dot shape when the substrates 100, 200 are viewed in plan view, although the invention encompasses any shape.

The spacer group SD may be repeatedly arranged along the first direction D1. The spacer group SD may be disposed on an area corresponding to the gate line GL, which corresponds to the light-blocking area BLP. The spacer group SD may have five to twenty spacers 400, although any number is contemplated. The number of spacers 400 may be set in consideration with a width L of the second direction D2 of the light-blocking area BLP, a size of the display panel 500, etc.

Even though a nominal number of the spacers 400 in each group SD may be theoretically decided, the actual number may be less, due to losses during a process for forming the spacers 400 on the display panel 500. Embodiments of the present invention seek to reduce or minimize this loss. Hereinafter, a printing plate capable of reducing or minimizing the loss of the beads, and a process for forming the spacers 400 by using the printing plate, will be explained in detail with reference to FIGS. 4 to 8.

Figure 4:
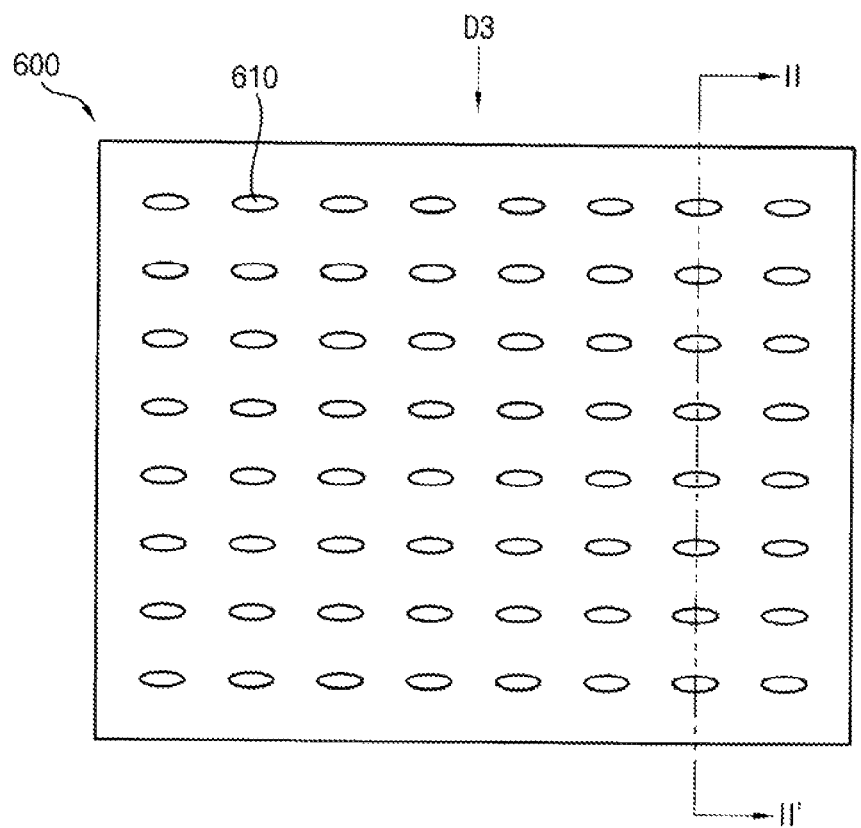
FIG. 4 is a plan view of a printing plate for manufacturing a spacer described in FIG. 2.
Figure 5:
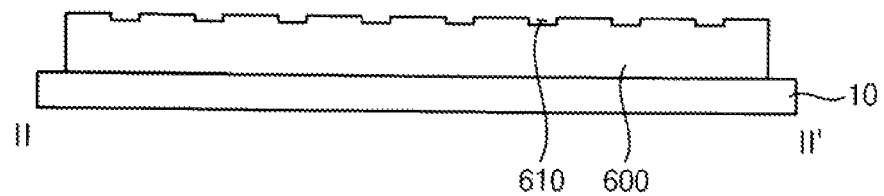
FIG. 5 is a cross-sectional view taken along a line II-II' of FIG. 4.

FIG. 4 is a plan view of a printing plate for manufacturing a spacer described in FIG. 2. FIG. 5 is a cross-sectional view taken along a line II-II' of FIG. 4.

Referring to FIGS. 4 and 5, in order to infiltrate the beads 40 into a printing plate 600 for manufacturing the spacers 400, the printing plate 600 may be disposed on a stage 10 of a printing apparatus for manufacturing a spacer. The printing apparatus may include a stage 10, the printing plate 600 disposed on the stage 10, and a printing roller 700 (refer to FIG. 9) onto which the beads 40 of the printing plate 600 are transferred. The printing roller 700 may be rotated so as to roll along a third direction D3 on the printing plate 600. Here, the third direction D3 may be identical to a short axis direction D3 of the receiving recesses 610.

The printing plate 600 for manufacturing the spacers 400 includes plural receiving recesses 610 formed thereon. Plural beads 40 may be disposed in each of the receiving recesses 610. The receiving recesses 610 are spaced apart from each other, and are recessed from a surface of the printing plate 600 by a predetermined depth. In each of the receiving recesses 610, an inner space is defined by a bottom surface that is lower than an upper surface of the printing plate 600, and by plural side walls connected to the bottom surface, when viewed from a cross-sectional view of the printing plate 600. The side walls may be connected to the bottom surface. Each of the receiving recesses 610 has a generally elliptical shape having a long axis and a short axis, when viewed in a plan view of the printing plate 600. Each of the receiving recesses 610 may be arranged in a matrix shape when viewed in a plan view of the printing plate 600, as shown in FIG. 4.

When the long axis length is less than about 1.25 times the short axis length, a planar surface of the receiving recesses 610 has an excessively circular shape (that is, the resulting shape is too close to that of a circle), such that it is difficult to maximize the number of the beads 40 infiltrated into the receiving recesses 610. Moreover, when the beads 40 infiltrated into the printing plate 600 are transferred into the printing roller 700, the beads 40 may be not transferred into the printing roller 700 in full. Thus, it is difficult to form a sufficient number of the spacers 400 on the first substrate 100 or the second substrate 200.

When the long axis length is equal to or greater than about two times of the short axis length, a difference between the long axis length and the short axis length is sufficiently great that the receiving recesses 610 have a narrow elliptical shape that appears significantly compressed along the short axis length direction. Thus, the number of the beads 40 capable of being received in the receiving recesses 60, respectively, may be relatively small in comparison with a case that each of the receiving recesses 610 has a more circular shape. Moreover, when the long axis length is equal to or greater than about two times the short axis length, the beads 40 received in the receiving recesses 610 may not all transfer into the printing plate 700. That is, too many beads 40 remain on the printing plate 600, so that the spacers 400 are not formed with sufficient reliability. Furthermore, when the long axis length is equal to or greater than about two times the short axis length, it is difficult to form the spacers 400 in a circular group. Such non-circular shapes often do not support external pressure properly.

Accordingly, a long axis length (i.e., a length of major axes) of the receiving recesses 610 may be about 1.25 times to about 2 times its short axis length (i.e., a length of the corresponding minor axes). For example, the long axis length of the receiving recesses 610 may be greater than the short axis of the receiving recesses 610 by about 1.5 times.

When the long axis length is from about 1.25 to about 2 times the short axis length, and the long axis length is less than about 15.75 μm, it may be difficult to fill the receiving recesses 610 with the beads 40. When the receiving recesses 610 are not filled with the beads 40, the spacers 400 are not formed. Moreover, when the long axis length is greater than or equal to about 1.25 times the short axis length and the long axis length is more than about 24 μm, the beads 40 received in the receiving recesses 610 may be not fully transferred onto the printing plate 700, so that spacers 400 are not reliably formed. Thus, the forming reliability of the spacer 400 may be generally acceptable when the long axis length is from about 15.75 μm to about 24 μm. Moreover, under these conditions, the number of the beads 40 infiltrated into in every 1 μm$^2$ of the receiving recesses 610 may be more than about 0.072 and less than about 0.085.

Figure 6:
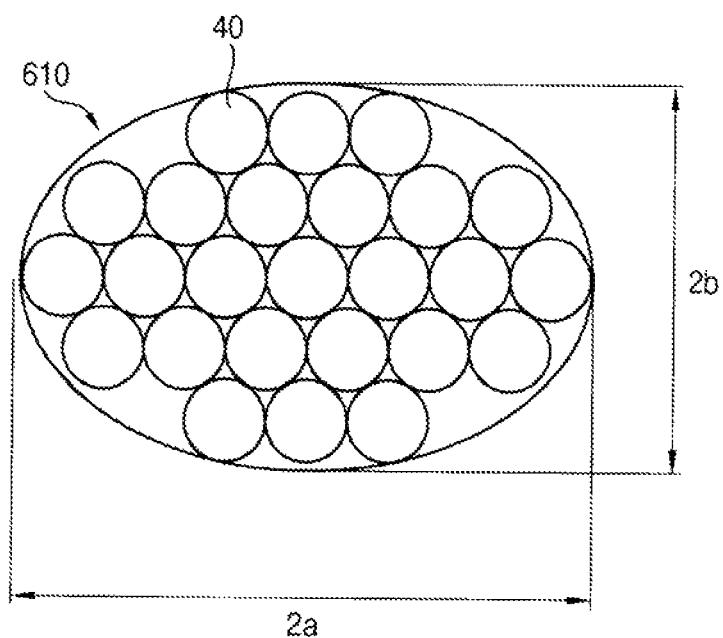
FIG. 6 is an enlarged plan view schematically illustrating a receiving recess of FIG. 4.

FIG. 6 is an enlarged plan view schematically illustrating a receiving recess of FIG. 4.

Referring to FIG. 6, the long axis length 2a may be about 24 μm, the short axis length 2b may be about 16 μm, and the diameter of the beads 40 may be about 3.4 μm. The long axis length 2a may be about 1.5 times the short axis length 2b. In this case, the number of beads 40 infiltrated into the receiving recesses 610 is twenty five. Thus, it is recognized that about 25 beads are infiltrated into a receiving recess 610 with an elliptical shape having a size of 301.44 μm$^2$. Therefore, the number of beads 40 capable of being infiltrated into in every 1 μm$^2$ of the receiving recesses 610 is about 0.082.

Figure 7:
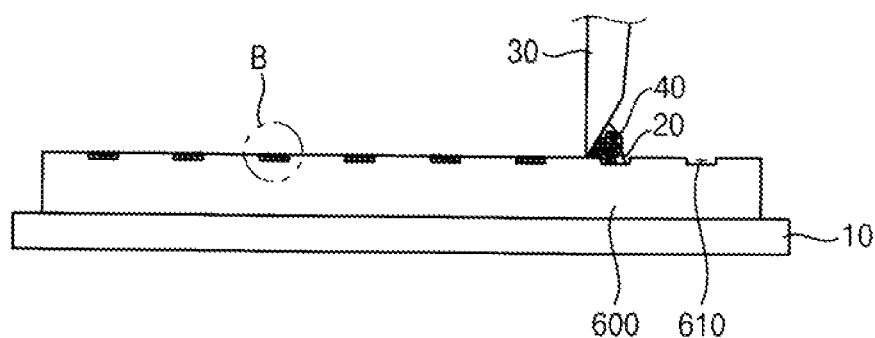
FIG. 7 is a cross-sectional view showing a method of filling beads on the printing plate of FIG. 4.

FIG. 7 is a cross-sectional view showing a method of filling beads on the printing plate of FIG. 4.

Referring to FIG. 7, the beads 40 are infiltrated into the receiving recesses 610 of the printing plate 600 disposed on the stage 10. For example, a solution 20 including the beads 40 is sprayed onto the printing plate 600 by using a bead sprayer (not shown). The solution 20 may then be cured by heat. For example, the solution 20 may be a mixture of a melamine resin or polyester resin, and the beads 40.

After the solution 20 is sprayed onto the printing plate 600, the solution 20 is relatively uniformly coated on a whole surface of the printing plate 600 by using a blade 30. The blade 30 may infiltrate the beads 40 into the receiving recesses 610 by scraping the surface of the printing plate 600 along a third direction D3 that is substantially identical to the short axis direction. Simultaneously, the beads 40 that are not infiltrated into the receiving recesses 610 may be removed from the printing plate 600 by the blade 30, as it sweeps over the edge of plate 600.

Figure 8:
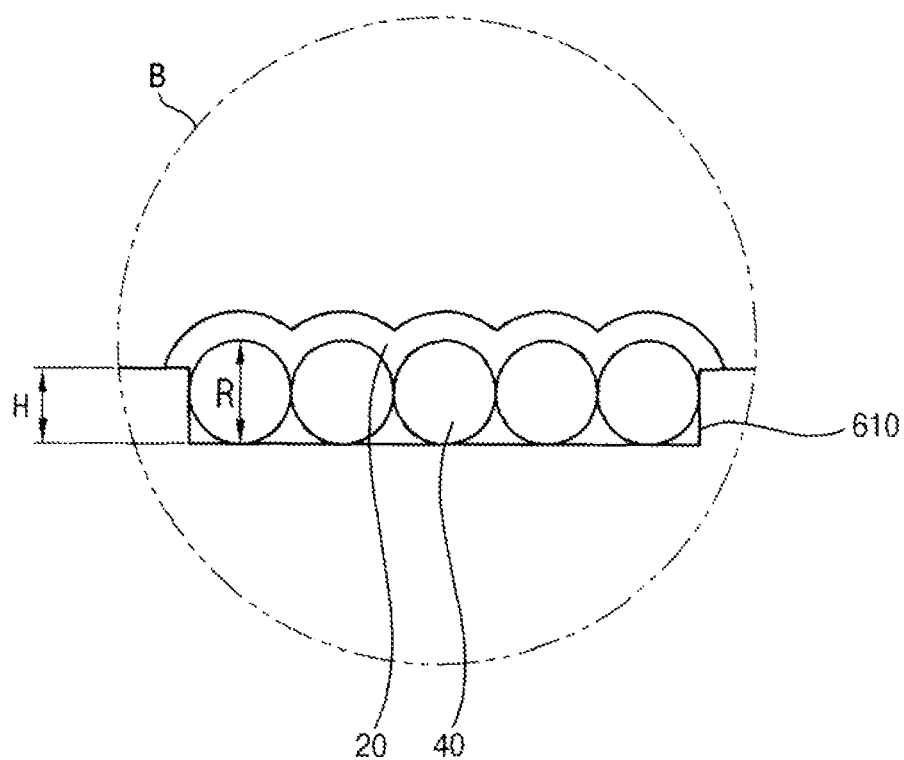
FIG. 8 is an enlarged plan view enlarging 'B' portion of FIG. 7.

FIG. 8 is an enlarged plan view of area 'B' of FIG. 7.

Referring to FIG. 8, a depth H of the receiving recess 610 may have a value smaller than diameters R of the beads 40.

When the depth H of the receiving recess 610 is less than about 75% of the diameters R of the beads 40, the beads 40 may easily break away from the receiving recess 610. For example, when a blade 30 is used to dispose the beads 40 on the receiving recess 610, the beads 40 may too easily escape from recesses 610 when a depth H of the receiving recess 610 is less than about 75% of a diameter R of the beads 40. When the depth H of the receiving recess 610 is more than about 85% of the diameter R of the beads 40, insufficient contact occurs between the outer surface of the printing roller 700 and the beads 40, so that it is difficult to transfer the beads 40 onto the printing roller 700. Moreover, the beads 40 may be redisposed in the receiving recess 610, forming a double layer of beads 40 within recess 610. To avoid these problems, the depth H of the receiving recess 610 may be about 75% to about 85% of the diameter R of the bead 40.

For example, when each diameter R of beads is about 3.4 µm, a depth H of the receiving recess 610 may be about 2.7 µm.

Figure 9:
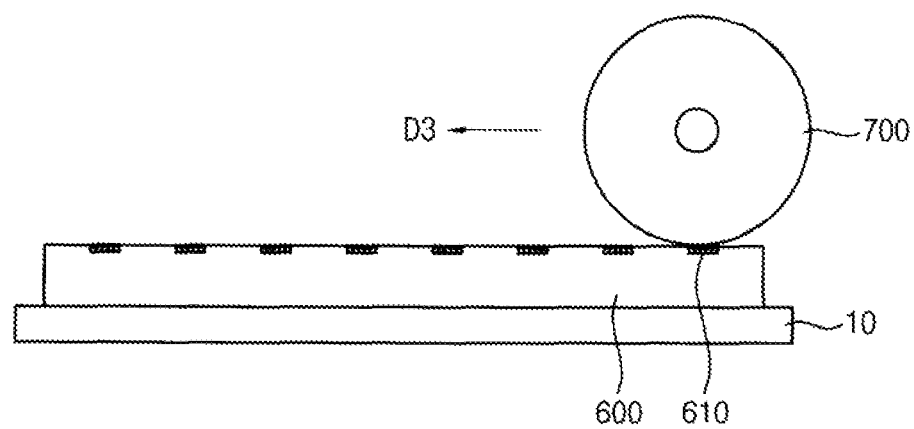
FIGS. 9 to 11 are cross-sectional views showing a method of manufacturing a second substrate of FIG. 2.
Figure 10:
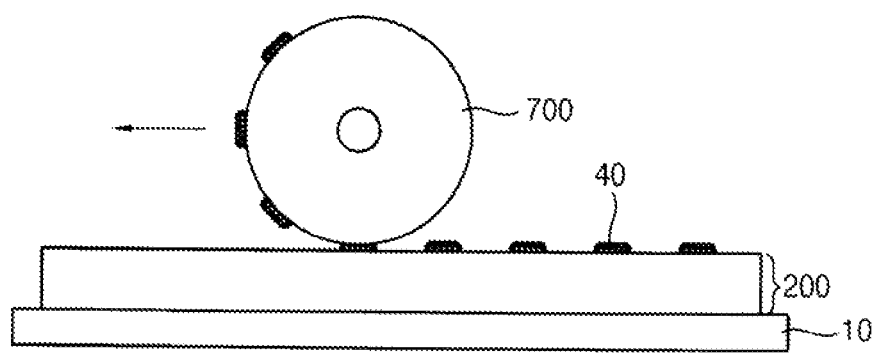
Figure 11:
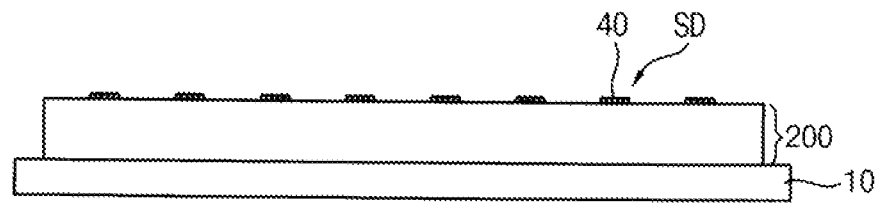

FIGS. 9 to 11 are cross-sectional views showing a method of manufacturing a second substrate of FIG. 2.

FIG. 9 is a cross-sectional view showing a process for transferring the beads 40 onto the printing roller 700. Referring to FIG. 9, the printing roller 700 is rotated at a surface of the printing plate 600, to transfer the beads 400 onto a surface of the printing roller 700. The printing roller 700 is made to contact the surface of the printing plate 600, and then the printing roller 700 is then rolled along a short axis direction of the receiving recesses 610, so that the beads 40 may be transferred onto the printing roller 700. When the printing roller 700 contacts the beads 40, a resin of the solution 20 is interposed between the printing roller 700 and the beads 40. Thus, the beads 40 may be relatively easily adhered to the printing roller 700.

FIG. 10 is a cross-sectional view schematically illustrating a process which transfers the beads 400 onto the second substrate 200. In FIG. 10, a member shown as a reference numeral "200" is substantially identical to the second substrate 200 shown in FIG. 2. Referring to FIG. 10, the printing roller 700 is rolled in the direction of the arrow shown, so as to form the spacers 400 on a surface of the second substrate 200 by depositing the beads 40. The spacers 400 may be formed, for example, on the common electrode 250 or on an alignment layer (not shown) disposed on the common electrode 250. The beads 40 may be disposed on an area where the black matrix pattern 220 is formed on the second substrate 200.

FIG. 11 is a cross-sectional view schematically illustrating a process which fixes the spacers 400 onto the second substrate 200. Referring to FIG. 11, the spacers 400 printed on the second substrate 200 are heat-treated, so that the resin of solution 20 may be cured. As the resin is cured, the spacers 400 may be fixed to the second substrate 200.

Then, liquid crystals may be dropped on the second substrate 200 upon which the spacers 400 are formed. After the liquid crystals are dropped, the first substrate 100 may be coupled to the second substrate 200, thus forming the display panel 500 shown in FIGS. 1 and 2.

In the present exemplary embodiment, the spacers 400 are formed on the second substrate 200. However, the beads 40 may alternatively be transferred into the first substrate 100, so that the spacers 400 may be formed on the first substrate 100. Even though the spacers 400 are formed on the first substrate 100, a display panel identical to the display panel 500 shown in FIGS. 1 and 2 may be manufactured.

Figure 12:
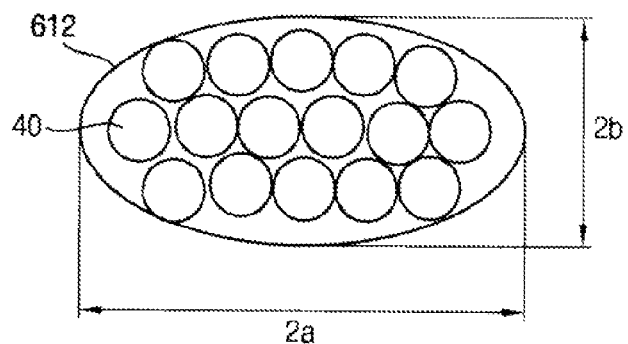
FIGS. 12 to 14 are plan views illustrating receiving recesses of comparative samples.
Figure 13:
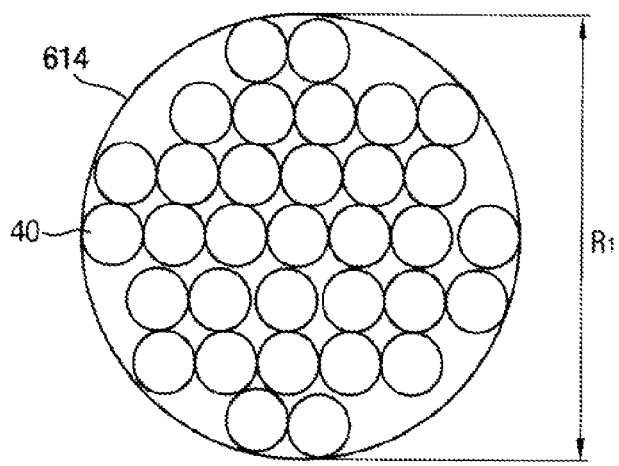
Figure 14:
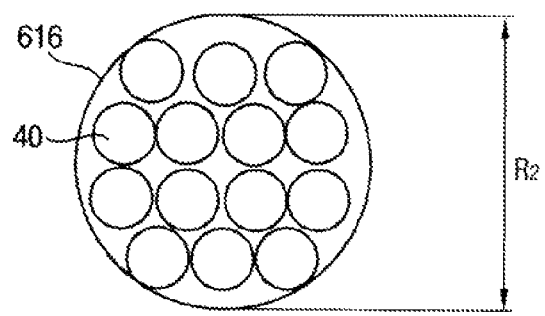

FIGS. 12 to 14 are plan views illustrating various receiving recesses.

FIG. 12 is a plan view showing that beads 40 are infiltrated into a receiving recess in which a long axis length is two times a short axis length. Referring to FIG. 12, the receiving recess 612 has a generally elliptical shape. A long axis length 2a of the receiving recesses 612 is about 24 µm, and a short axis length 2b of the receiving recesses 612 is about 12 µm. In this case, the beads 40 are general ball shapes having a diameter of about 3.4 µm, and may be infiltrated into the receiving recess 612, where the number of beads 40 is about sixteen. That is, the number of beads 40 capable of being infiltrated into 1 µm² of the receiving recess 612 is about 0.070.

FIGS. 13 and 14 are plan views showing beads 40 infiltrated into receiving recesses 614 and 616 having generally circular shapes when viewed in a plan view.

Referring to FIG. 13, the receiving recess 614 has a generally circular shape, and a diameter R1 of the receiving recess 614 is about 24 µm. In this case, beads 40 having a diameter of about 3.4 µm may be infiltrated into the receiving recess 614. In this case, the number of beads 40 capable of being infiltrated into in every 1 µm² of the receiving recesses 614 is about 0.072. It is noted that the number of beads 40 capable of being infiltrated in every 1 µm² of the receiving recess 610 shown in FIG. 6 is greater than the number of beads 40 capable of being infiltrated into in every 1 µm² of the receiving recess 614 shown in FIG. 13. Moreover, the receiving recess 612 of FIG. 12 has a size smaller than that of the receiving recess 616 of FIG. 14; however, the number of beads 40 capable of being infiltrated in every 1 µm² of recess 612 may be equal to the number of beads 40 capable of being infiltrated in every 1 µm² of the receiving recess 614.

When the long axis length is 2 times the short axis length, similar to the receiving recess 612 shown in FIG. 12, the number of beads 40 capable of being infiltrated into the receiving recess 612 is substantially equal to, as opposed to greater than, the number of beads 40 capable of being infiltrated in every 1 m² of the receiving recess 614 of FIG. 13. Thus, it is preferable for the long axis length of an elliptical receiving recess 610 to be less than about 2 times the short axis length of the receiving recess 610.

Referring to FIG. 14, the receiving recess 616 has a circular shape, and a diameter R2 of the receiving recess 616 is about 16 µm. In this case, beads 40 having a diameter of about 3.4 µm may be infiltrated into the receiving recess 616. That is, the number of beads 40 capable of being infiltrated into in every 1 µm² of the receiving recesses 616 is about 0.069.

In summary, when the receiving recesses 612, 614 and 616 explained in FIGS. 12 to 14 are compared with the receiving recess 610 shown in FIG. 6, it can be seen that the number of beads 40 capable of being infiltrated into every 1 µm² of an elliptical receiving recess is greater than the number of beads 40 capable of being infiltrated into every 1 µm² of a circular receiving recess. For such generally elliptical shapes, the length of the long (major) axis may be about 1.25 times to about 2 times the length of the short (minor) axis. For example, the length of the long axis may be about 1.5 times the length of the short axis.

Reliability Test for a Printing Plate 1

Experiment 1

Five printing plates were made, each of which has elliptical receiving recesses with a depth of about 2.7 µm, where the recesses of each plate have a short axis length/long axis length of 10.5 µm/15.75 µm, 13.5 µm/20.25 µm, 16.5 µm/24.75 µm, 19.5 µm/29.25 µm and 22.5 µm/33.75 µm, respectively. After ball-shaped beads with a diameter of about 3.35 µm were infiltrated into one receiving recess, an average number of beads actually infiltrated into this receiving recess was measured. The measured result is presented in FIG. 15 as Experiment 1.

Experiment 2

Five printing plates substantially identical to those of Experiment 1 were prepared. After ball-shaped beads with a diameter of about 3.4 µm were infiltrated into one receiving recess, and an average number of beads actually infiltrated into this receiving recess was measured. The measured result is presented in FIG. 15 as Experiment 2.

Comparative Experiment 1

Five printing plates with plural circular receiving recesses were then prepared, where the recesses of each plate have a depth of about 2.7 μm, as well as diameters of about 10.5 μm, about 13.5 μm, about 16.5 μm, about 19.5 μm and about 22.5 μm, respectively. After ball-shaped beads with a diameter of about 3.35 μm were infiltrated into one receiving recess, an average number of beads actually infiltrated into this receiving recess was measured. The measured result is presented in FIG. 15 as Comparative Experiment 1.

Comparative Experiment 2

Five printing plates substantially identical to those of Comparative Experiment 1 were prepared. After beads of a ball shape which has a diameter of about 3.4 μm were infiltrated into one receiving recess, an average number of beads actually infiltrated into the receiving recess was measured. The measured result is presented in FIG. 15 as Comparative Experiment 2.

Figure 15:
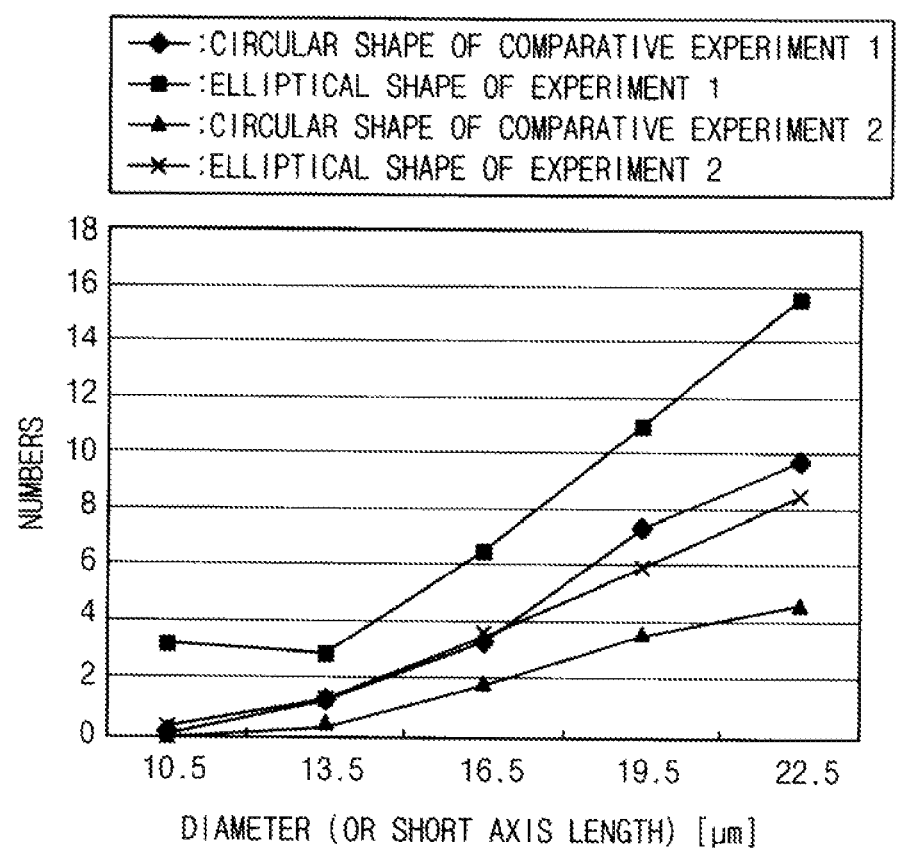
FIG. 15 is a graph showing a relationship between a short axis length of receiving recesses of samples according to the present invention and the number of beads filled thereon and between a diameter of a receiving recess of comparative samples and the number of beads filled thereon.

FIG. 15 is a graph showing a relationship between either a short axis length or a diameter of receiving recesses of samples according to the present invention, and the number of beads filled therein.

In FIG. 15, the X-axis represents a diameter when a receiving recess is a circular shape, and represents a short axis length when the receiving recess is an elliptical shape. When the receiving recess is an elliptical shape, the long axis length is about 1.5 times the short axis length. The Y-axis represents an average total number of beads actually infiltrated into one receiving recess. In this case, the average total number may be calculated by arithmetical mean.

Referring to FIG. 15, according to Experiment 1, an average number of beads actually infiltrated along a short axis length of the receiving recess was about 3.3, about 2.9, about 6.6, about 11 and about 15.6, respectively. According to Experiment 2, an average number of beads actually infiltrated along a short axis length of the receiving recess was about 0.3, about 1.3, about 3.5, about 6 and about 8.5, respectively.

According to Comparative Experiment 1, an average number of beads actually infiltrated in accordance with diameters of the receiving recess was about 0.1, about 1.2, about 3.3, about 7.4 and about 9.8, respectively. According to Comparative Experiment 2, an average number of beads actually infiltrated in accordance with diameters of the receiving recess was about 0.1, about 0.3, about 1.8, about 3.6 and about 4.8, respectively.

According to the results of Experiments 1 and 2 and Comparative Experiments 1 and 2, it is recognized that the number of beads actually infiltrated into receiving recesses having an elliptical shape is greater than the number of beads actually infiltrated into corresponding receiving recesses having a circular shape.

Reliability Test for a Printing Plate 2

Experiment 3

Five printing plates were prepared, each having plural elliptical receiving recesses. The recesses of each plate have a depth of about 2.7 μm, and a short axis length/long axis length of 10.5 μm/15.75 μm, 13.5 μm/20.25 μm, 16.5 μm/24.75 μm, 19.5 μm/29.25 μm and 22.5 μm/33.75 μm, respectively. After ball-shaped beads with a diameter of about 3.35 μm were infiltrated into one receiving recess, an average number of beads actually infiltrated into the receiving recess was measured. Then, the beads were transferred onto the printing roller by rolling the printing roller over the printing plate, and an average number of beads actually remaining on the printing plate was measured. A ratio of the number of beads remaining on the printing plate to the number of beads infiltrated on the printing plate will be defined as "bead number ratio." The bead number ratio may be calculated in accordance with diameters of the receiving recesses, and then the result thereof is presented in FIG. 16.

Experiment 4

A bead number ratio corresponding to a ball-shaped bead having a diameter of about 3.4 μm was respectively measured for five printing plates substantially identical to Experiment 3. The result is presented in FIG. 16 as Experiment 4.

Comparative Experiment 3

Five printing plates with plural circular receiving recesses having diameters of about 10.5 μm, about 13.5 μm, about 16.5 μm, about 19.5 μm and about 22.5 μm, respectively, were prepared. After ball-shaped beads with a diameter of about 3.35 μm were infiltrated into one receiving recess, and a bead number ratio corresponding to a ball-shaped bead having a diameter of about 3.35 μm was respectively measured for the five printing plates. The measured result is presented in FIG. 16 as Comparative Experiment 3.

Comparative Experiment 4

A bead number ratio corresponding to a ball-shaped bead with a diameter of about 3.4 μm was respectively measured for five printing plates substantially identical to Comparative Experiment 3. The result is presented in FIG. 16 as Comparative Experiment 4.

Figure 16:
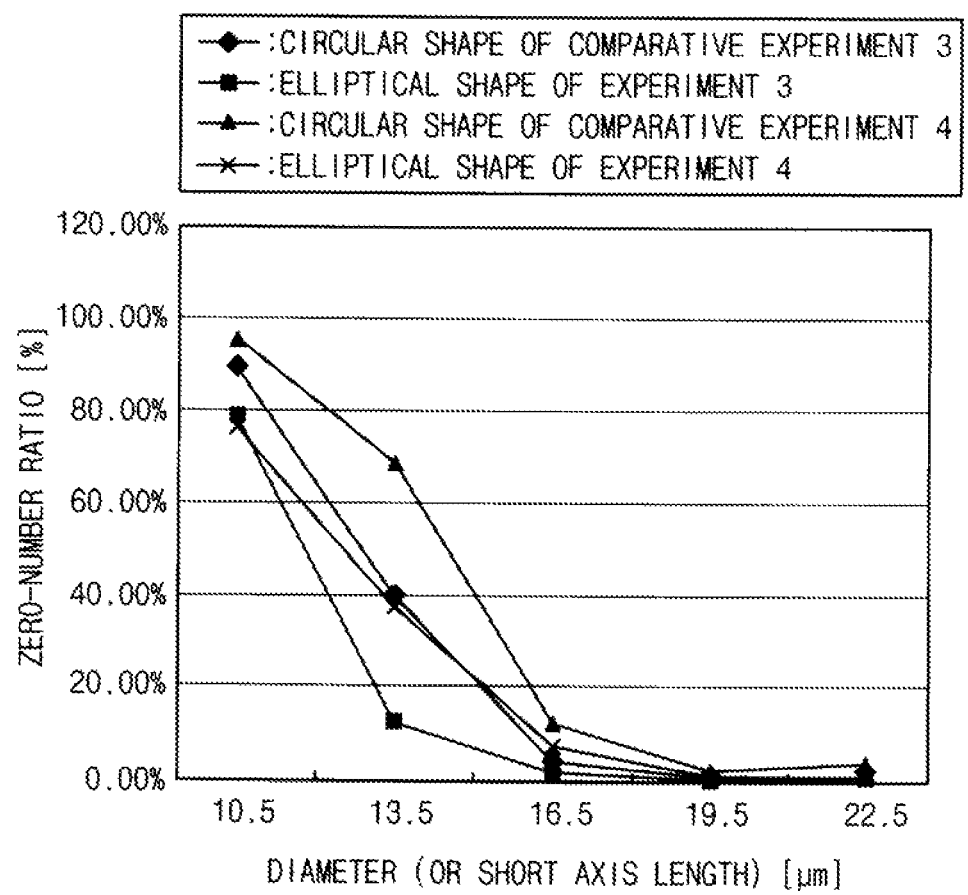
FIG. 16 is a graph showing a relationship between bead number ratio for a short axis length of the receiving recesses of samples according to the present invention and diameters of receiving recesses of comparative samples.

FIG. 16 is a graph showing a relationship between bead number ratio for a short axis length of the receiving recesses of samples according to the present invention, and diameters of receiving recesses of comparative samples.

In FIG. 16, the X-axis represents a diameter when a receiving recess has a circle shape, and a short axis length when the receiving recess has an elliptical shape. When the receiving recess has an elliptical shape, a long axis length is about 1.5 times the corresponding short axis length. The Y-axis represents a bead number ratio. A ratio at which beads are transferred onto the printing plate is low when the bead number ratio is high, and a ratio at which beads are transferred onto the printing plate is high when the bead number ratio is low.

Referring to FIG. 16, according to Experiment 3, a bead number ratio is about 78.30%, about 12.30%, about 1.40%, about 0% and about 0%, respectively, in accordance with a short axis length of the receiving recess. Moreover, according to Experiment 4, a bead number ratio is about 76.60%, about 37.30%, about 7.40%, about 0.6% and about 0%, respectively, in accordance with a short axis length of the receiving recess.

According to Comparative Experiment 3, a bead number ratio is about 89.70%, about 39.90%, about 4%, about 0% and about 0%, respectively, in accordance with a diameter of the receiving recess. Moreover, according to Comparative Experiment 4, a bead number ratio is about 96.3%, about 69.50%, about 12.3%, about 2.3% and about 3.40%, respectively, in accordance with a diameter of the receiving recess.

According to Experiments 3 and 4 and Comparative Experiments 3 and 4, it is recognized that a bead number ratio corresponding to an elliptical receiving recess is lower than a bead number ratio corresponding to a circular receiving recess. Therefore, it is recognized that a ratio at which beads are transferred onto the printing roller in a case of elliptical receiving recesses is greater than a ratio at which beads are transferred into the printing roller in a case of a circular receiving recess.

As described above in detail, according to the present invention, the received number of spacers per unit area of the receiving recess may be increased, and the spacers may be more uniformly provided to each of plural receiving recesses, if the recesses are made generally elliptical rather than circular. Thus, the spacers may maintain a distance between the first and second substrates more stably, so that press characteristics may be enhanced and smear defects occurring when the display panel is pressed may be prevented. Moreover, the distance between the first and second substrate may be maintained more uniformly, so that display quality of the display panel may be improved.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A printing apparatus for manufacturing a spacer, the printing apparatus comprising:
    a printing plate having a plurality of receiving recesses formed thereon, the receiving recesses each having a generally elliptical shape, and the receiving recesses configured to hold a plurality of beads; and
    a printing roller configured to transfer the beads in the receiving recesses onto an outer surface of the printing roller by rolling over the receiving recesses, and to transfer the beads on the outer surface onto an external substrate;
    wherein a length of major axes of the receiving recesses is equal to or greater than about 1.25 times a length of the corresponding minor axes, and less than about 2 times the length of the corresponding minor axes, so that each recess is shaped to hold therein a maximum number of the beads that is arranged in a group having an aggregate shape that is neither at least approximately circular nor at least approximately linear.

2. The printing apparatus of claim 1, wherein the length of the major axes is about 1.5 times the length of the corresponding minor axes.

3. The printing apparatus of claim 1, wherein a number of the beads infiltrated in 1 µm² of the receiving recesses is more than about 0.072 and less than about 0.085.

4. The printing apparatus of claim 1, wherein a number of the beads infiltrated into each of the receiving recesses is twenty five when a long axis and a short axis of the receiving recesses are about 24 µm and about 16 µm, respectively.

5. The printing apparatus of claim 1, wherein a depth of the receiving recesses is about 75% to about 85% of a diameter of the beads.

6. The printing apparatus of claim 1, wherein each of the receiving recesses is defined by a bottom surface disposed to be lower than an upper surface of the printing plate, and side walls connected between the bottom surface and the upper surface.

7. A method of manufacturing a display panel, the method comprising:
    infiltrating a plurality of beads into receiving recesses of a printing plate, the receiving recesses each having an elliptical shape with a long axis and a short axis, wherein each long axis is between about 1.25 and about 2 times a length of the corresponding short axis, so that each receiving recess holds therein a maximum number of the beads that is arranged in a group having an aggregate shape that is neither at least approximately circular nor at least approximately linear;
    rolling a printing roller over the receiving recesses, so as to transfer the beads onto an outer surface of the printing roller;
    transferring the beads from the outer surface of the printing roller onto a light-blocking area of a first substrate, so as to form spacers on the first substrate; and
    coupling a second substrate to the first substrate.

8. The method of claim 7, wherein the infiltrating further comprises:
    coating a solution onto the printing plate, the solution including the beads; and
    scraping a blade over a surface of the printing plate on which the solution is coated.

9. The method of claim 7, wherein a number of the beads infiltrated into every 1 µm² of the receiving recesses is more than about 0.072 and less than about 0.085, when the beads are infiltrated into the receiving recesses.

10. The method of claim 7, wherein a number of beads infiltrated into each of the receiving recesses is twenty five when a long axis and a short axis of the receiving recesses are about 24 µm and about 16 µm, respectively, when the beads are infiltrated into each of the receiving recesses.

11. The method of claim 7, wherein at least two beads form a group when the spacer is formed on the first substrate, and the group has a generally circular shape.

12. The method of claim 7, further comprising:
    forming a liquid crystal layer between the first substrate and the second substrate.

13. The method of claim 7, wherein the first substrate comprises:
    a color filter formed on a pixel area surrounded by the light-blocking area; and
    a black matrix pattern formed on the light-blocking area.

14. The method of claim 7, wherein the first substrate comprises:
    a pixel electrode formed on a pixel area surrounded by the light-blocking area; and
    a plurality of signal lines formed on the light-blocking area to be electrically connected to the pixel electrode.

* * * * *